UNITED STATES PATENT OFFICE.

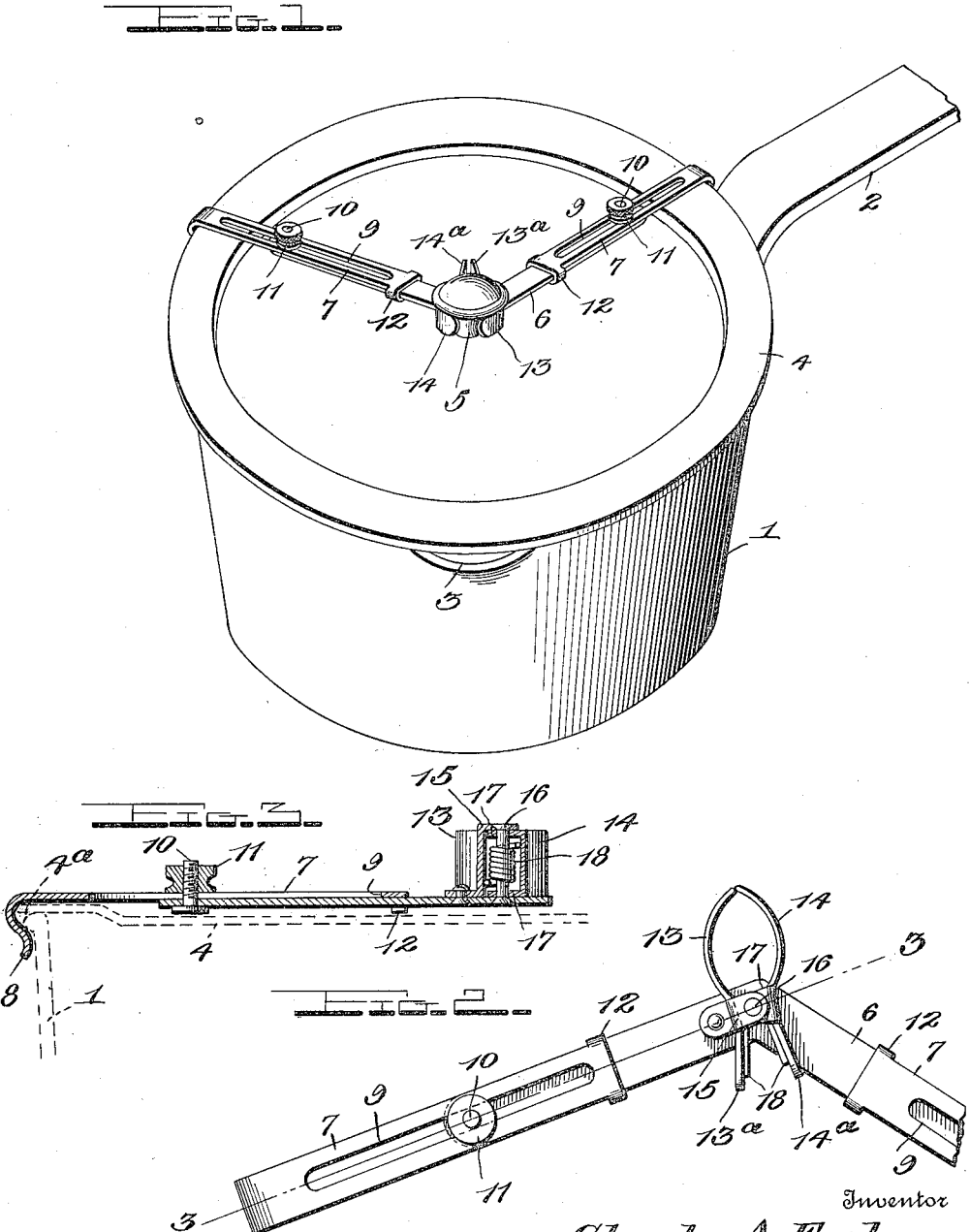

CHARLES A. FORD, OF NEWARK, NEW JERSEY.

POT-COVER ATTACHMENT.

1,080,906.

Specification of Letters Patent. Patented Dec. 9, 1913.

Application filed April 18, 1913. Serial No. 761,883.

*To all whom it may concern:*

Be it known that I, CHARLES A. FORD, citizen of the United States, residing at Newark, in the county of Essex and State of New Jersey, have invented certain new and useful Improvements in Pot-Cover Attachments, of which the following is a specification.

The present invention relates to an attachment for the covers of cooking pots, saucepans, and like containers whereby the cover can be readily removed at any time, although it is held securely in position when the container is tilted for the purpose of draining boiling liquids therefrom, the object of the invention being to provide a device of this character which embodies novel features of construction whereby it can be readily applied to those covers in which the central knob or finger piece is integral with the cover or permanently applied thereto in such a manner that it can not be removed.

Further objects of the invention are to provide a device of this character which can be readily adjusted to fit all sizes of covers, which does not interfere with the usual manner of removing and handling the cover, and which will eliminate the necessity for manually holding the cover in position upon the container when tilting the same to drain boiling liquids from cooked vegetables or the like.

With these and other objects in view, the invention consists in certain novel combinations and arrangements of the parts as will more fully appear as the description proceeds, the novel features thereof being pointed out in the appended claims.

For a full understanding of the invention, reference is to be had to the following description and accompanying drawing, in which—

Figure 1 is a perspective view of a cooking pot and cover provided with an attachment constructed in accordance with the invention. Fig. 2 is a top plan view of the attachment, one end thereof being broken away, and Fig. 3 is a sectional view on the line 3—3 of Fig. 2.

Corresponding and like parts are referred to in the following description and indicated in all the views of the drawing by the same reference characters.

Specifically describing the present embodiment of the invention, the numeral 1 designates a cooking pot which is provided with the usual handle 2 and has a small pouring spout 3 at one side thereof. A cover 4 is shown as applied to the cooking pot 1, the said cover being of the conventional construction and being provided at the central portion thereof with a knob or finger piece 5, the said knob being permanently applied to the cover so that it can not be removed therefrom.

The body portion 6 of the attachment comprises a pair of angularly disposed arms which are preferably disposed at an obtuse angle to each other and radiate from the center of the cover when the attachment is in position thereon. Each of these arms has an extension 7 adjustably connected thereto, the said extensions terminating in the downwardly extending hooked fingers 8 which project from the edge of the cover 4 and are adapted to engage the rim 4ª of the cooking pot 1. The extensions 7 are shown as provided with the longitudinal slots 9 which loosely receive the threaded studs 10 projecting from the body portion 6, the said threaded studs 10 being capped by the clamping nuts 11. It will also be observed that the inner ends of the extension 7 are formed with the laterally projecting returned fingers 12 which engage the edges of the stock or body portion 6 to direct the extensions in their movement and prevent rotation thereof about the threaded studs 10.

The central portion of the stock 6 is provided with means for engaging the knob 5 of the cover 4. In the present instance a clamp is provided for this purpose, the said clamp comprising a fixed jaw 13 and a movable jaw 14. The fixed jaw 13 is rigid with a bracket 15 which is riveted or otherwise permanently secured to the stock 6, the upper end of the bracket being formed with an overhanging portion which is connected to the stock 6 by means of the pivot pin 16. The movable jaw 14 is provided at the upper and lower edges thereof with the inwardly projecting pivot ears 17 which engage the pin 16. A coil spring 18 surrounds the pivot pin 16, the opposite ends thereof being extended rearwardly and caused to engage the rearwardly extending finger pieces 13ª and 14ª of the respective jaws. This spring normally tends to move the jaw 14 toward the fixed jaw 13, although by grasping the finger pieces 13ª and 14ª and pressing the same together the jaw 14 may be moved away from the fixed jaw 13.

In applying the attachment to the cover 4, the finger pieces 13ª and 14ª are grasped by the hand and pressure applied thereto to open the jaws of the clamp. The clamp is then applied to the knob 5 and brought into a proper engagement therewith, after which the finger pieces 13ª and 14ª are released and the two jaws 13 and 14 of the clamp permitted to be brought into a yielding engagement with the knob 5 by means of the spring 18. The extensions 7 are then adjusted upon the arms of the angular body portion 6 so as to bring the fingers 8 into engagement with the edge of the cover. The cover is adapted to be applied to the cooking pot 1 in such a manner that the fingers 8 engage the rim 4ª of the pot upon the side thereof which is opposite the pouring spout 3. When the cooking pot 1 is tilted for the purpose of draining a boiling liquid from boiled potatoes or the like, the tendency of the cover to slip downwardly draws the fingers 8 into a firm engagement with the rim 4ª of the cooking pot 1. Not only is the tendency of the cover to slip downwardly resisted by these fingers, but they also serve to retain the cover against the top of the cooking pot so that it may be tilted through a very large angle without danger of the pressure of the vegetables against the cover forcing the same outwardly away from the cooking pot.

Having thus described the invention, what I claim as new and desire to secure by Letters Patent, is:—

1. An attachment for the covers of cooking pots and the like, including a stock formed with a pair of angularly disposed arms, a pair of clamping jaws mounted upon the stock at the intersection of the augularly disposed arms, said clamping jaws being adapted to detachably engage the knob of the cover to retain the stock in position thereon, and hooked fingers carried by the arms of the stock and adapted to project downwardly over the edge of the cover to engage the rim of the cooking pot.

2. An attachment for the covers of cooking pots and the like, including a stock formed with a pair of angularly disposed arms, a fixed jaw at the intersection of the arms, a movable jaw mounted for coöperation with the fixed jaw to engage the knob of the cover for the purpose of retaining the stock in position thereon, and hooked fingers carried by the arms of the stock, said hooked fingers being adapted to project downwardly from the edge of the cover and engage the rim of the cooking pot.

3. An attachment for the covers of cooking pots and the like, including a stock formed with a pair of angularly disposed arms, a bracket projecting from the stock, a fixed jaw carried by the bracket, a coöperating movable jaw hinged between the bracket and the stock, a spring for forcing the movable jaw toward the fixed jaw, the said jaws being adapted to engage the knob of the cover to hold the attachment in position thereon, and hooked fingers carried by the angularly disposed arms of the stock, said hooked fingers being adapted to project downwardly from the edge of the cover and to engage the rim of the pot.

In testimony whereof I affix my signature in presence of two witnesses.

CHARLES A. FORD.

Witnesses:
HENRY BOSSET,
FERD SULZER.

Copies of this patent may be obtained for five cents each, by addressing the "Commissioner of Patents, Washington, D. C."